July 6, 1965   E. S. FRIEDLANDER   3,193,758
ELECTRIC SUPPLY ARRANGEMENTS
Filed Sept. 15, 1961                    3 Sheets-Sheet 3

INVENTOR
ERICH SIEGFRIED FRIEDLANDER
ATTORNEYS

United States Patent Office 3,193,758
Patented July 6, 1965

3,193,758
ELECTRIC SUPPLY ARRANGEMENTS
Erich Siegfried Friedlander, Sutton Coldfield, England, assignor to The General Electric Company Limited, London, England
Filed Sept. 15, 1961, Ser. No. 138,306
Claims priority, application Great Britain, Sept. 21, 1960, 32,428/60; Oct. 11, 1960, 34,792/60
12 Claims. (Cl. 323—60)

This invention relates to electric supply arrangements in which a load circuit including a fluctuating load is fed from an electric supply network. The invention is especially applicable to means for reducing voltage flicker in, for example, a polyphase supply network feeding a high power electric arc furnace through a transformer and reactors, but in its broadest aspect the invention is applicable to both single phase and polyphase networks.

Arrangements of this type are described in copending application, Serial No. 136,906, Friedlander et al., filed March 8, 1961 and entitled "Electric Supply Arrangements," now United States Patent No. 3,162,800. According to the invention described in that application in an electric supply arrangement in which a load circuit including a fluctuating load is fed from an electric supply network, means are provided for reducing voltage flicker on the supply network arising from load fluctuations, said means comprising essentially a saturable reactor which is connected in parallel with the load circuit and coupled thereto in such a way that the voltage across the reactor, and hence the saturation of the reactor, is caused to follow load fluctuations without delay whereby to absorb current fluctuations in the load circuit.

The present invention is concerned particularly with modifications of the apparatus described in the above-mentioned application and it is a feature of this invention that the saturable reactor is included in a compensating circuit which is inductively coupled to the fluctuating load.

Figure 1:
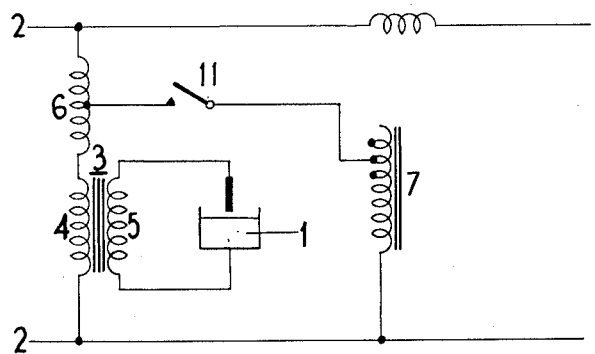

Other objects and features of the invention will be apparent from the following description taken in conjunction with the accompanying drawings in which:

FIGURE 1 is a circuit diagram of an electric supply arrangement as described in the above-mentioned application; and FIGURES 2 to 7 are circuit diagrams of six electric supply arrangements in accordance with the present invention.

Referring to FIGURE 1, the circuit shown is substantially identical with that of FIGURE 1 of the drawings accompanying copending application, Serial No. 136,906, the present circuit being shown however as a single phase circuit for simplicity. In this circuit, a load such as an electric arc furnace 1 is fed from a supply network 2 via a transformer 3. The transformer has a primary winding 4 and a secondary winding 5 connected to the electrodes of the furnace 1. In series with the primary winding 4 is an air gap reactor 6, and a saturable reactor 7 is connected by way of a switch 11 between a line terminal and the tapping on the reactor. The tapping on the reactor 6, which can be adjusted for optimum tuning by means of tap changers, is chosen so that the voltage across the saturable reactor 7 is caused to follow load fluctuations without delay whereby to absorb current fluctuations at the transformer 3. This is achieved by tapping the reactor 6 in the ratio $n:1-n$, where $n$ is a fraction satisfying the condition $$nX_1 - X_3 = 0$$

where $X_1$ is the reactance of the reactor 6, and $X_3$ is the reactance of the saturable reactor 7. If this condition is satisfied, it can readily be shown that the current in the supply network is substantially independent of current fluctuations in the transformer winding 4, and hence of local fluctuations.

If in these conditions the reactor 6 is tapped in the ratio $n:1-n$, it can be shown that the voltage across the saturable reactor 7 is given by $$E_2 = E_1 - (1-n)(E_1 - E_3)$$

or $$\frac{E_2}{n} = E_1 + \frac{(1-n)}{n}E_3$$

where $E_1$ is the line voltage, $E_2$ is the voltage across the saturable reactor, and $E_3$ is the primary voltage of the transformer.

This indicates that the voltage across the saturable reactor 7, in order to satisfy the condition necessary for suppression of voltage flicker, can be derived from the line voltage together with the transformer voltage without any need for the tapped reactors 6. This is a great advantage in the case of high power loads where the use of tapped reactors may not be practicable owing to the leakage reactance of the transformer 3 itself being large.

One arrangement by which the present invention makes use of this result is illustrated in FIGURE 2, which again shows a single phase circuit for simplicity but which can be a three phase circuit in practice.

Figure 2:
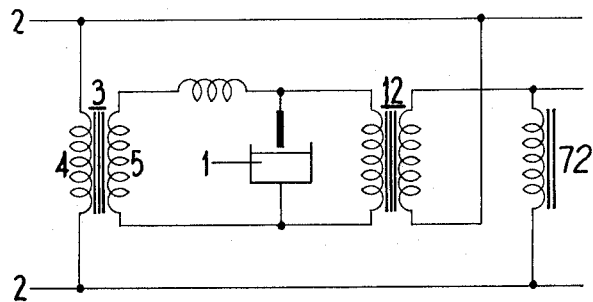

Referring to FIGURE 2, the saturable reactor 72 is connected in series with the secondary winding of a transformer 12 whose primary winding is connected across the load 1, the saturable reactor 72 being coupled to the primary winding of the transformer 3 so as to be capable of absorbing current fluctuations thereat. The output-input voltage ratio of the transformer 12 is $(1-n):n$, and hence the output voltage of this transformer is $$\frac{1-n}{n}E_3{}^1$$

where $E_3{}^1$ is the voltage across the load, and $n$ has the numerical value previously assigned to it.

It follows that with this circuit the voltage across the saturable reactor is given by $$E_2{}^1 = E_1 + \frac{1-n}{n}E_3{}^1$$

The condition for optimum reduction of voltage flicker can thus be satisfied. This condition involves that the reactor should be at the knee of the saturation characteristic when $E_3{}^1 = 0$, i.e. when the electrodes of the furnace are short circuited and that the time constant of the saturated reactor to switching transients should be less than 10 m.secs. Some additional resistance may be provided if necessary in series to the saturated reactor to achieve this.

Figure 3:
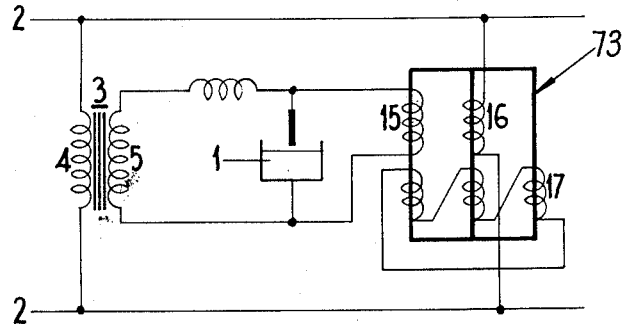

FIGURE 3 illustrates another circuit using the same principle but in which "tuning" of the saturable reactor 73 is achieved by the superposing of magnetic fluxes instead of compounding of voltages. In this circuit the saturable reactor comprises a three limb saturable core, one limb of which carries a main reactor winding 16 connected across the network 2 and another limb of which carries a winding 15 which is connected across the load 1. The voltage applied to the winding 15 controls the saturation of the core of the saturable reactor 73 and so controls the current which can flow through the winding 16. The numbers of turns on these windings are chosen so that the resultant flux in the third limb of the core is proportional to the value, $$E_1 + \frac{1-n}{n}E_3$$

An equalising winding in the form of a delta-connected winding 17 is provided for the purpose of avoiding large magnetic forces between the core yokes which could lead to excessive losses in the reactor tank.

Figure 4:
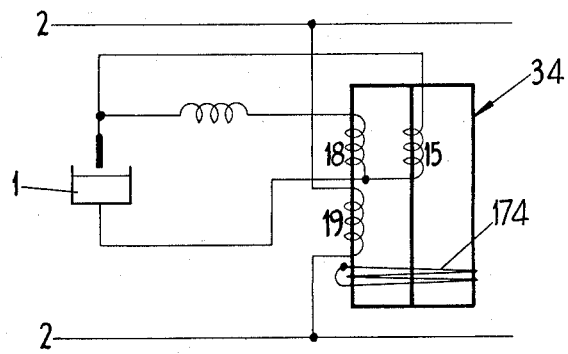

FIGURE 4 illustrates yet another circuit which is very similar to that of FIGURE 3, but which incorporates some modifications. Instead of having a separate transformer 3, the circuit uses a composite arrangement 34 constituting both transformer and saturable reactor. The load 1 is fed from a winding 18 on one of the limbs of the reactor core, this winding constituting the transformer secondary winding; the primary winding 19 of the transformer, being wound on the same core limb, is connected to the supply network and also performs the same function as the winding 16 in FIGURE 3. On the second limb is wound a winding 15 connected across the load 1. The equalising winding 174 is shown not as a delta-connected winding in this case, but as a simple winding encircling all three core limbs.

Figure 5:
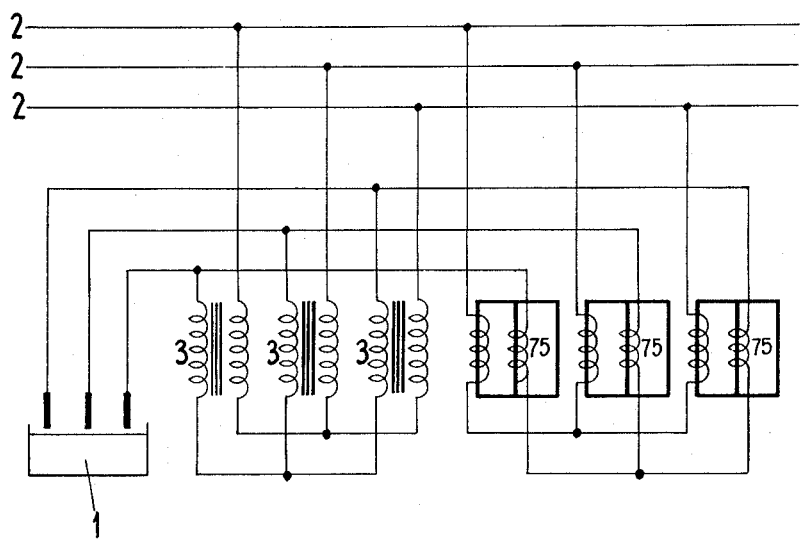

Referring now to FIGURE 5, this figure illustrates a three-phase circuit arrangement which in other respects is identical with that of FIGURE 3. It will be noted that three separate saturable cores 75 are used, one for each phase. It is to be understood that each of the arrangements described may be modified for use in a three-phase system.

In the application to an electric arc furnace, in order to maintain arc stability it has been found possible to produce a voltage of higher frequency to secure easy re-ignition of the arc, by taking advantage of the harmonics generated by the saturable reactor itself. Mathematical analysis of the circuits shows that a flat saturation characteristic leading to a high "tapping" ratio $n:1-n$ tends to produce a maximum voltage wave distortion, and vice versa. With a flat saturation characteristic the harmonic voltages produced can be use with advantage for producing a very large open circuit voltage of harmonic order. It is necessary however to keep the voltage on the supply busbars as sinusoidal as possible by means of harmonic filters connected to these busbars. In these conditions, the voltage across the section through which the harmonic current flows, when the arc furnace is open-circuited, is multiplied in the ratio $1:1-n$, where $n$ has the same value as before.

In this way it is possible to produce a large open circuit voltage of higher frequency without introducing high frequency generators.

Figure 6:
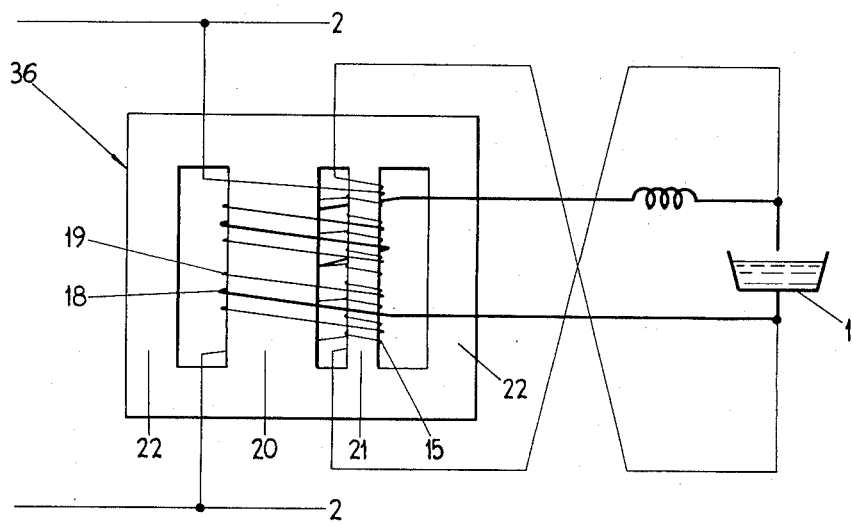

Referring now to FIGURE 6, a load 1, such as a single phase arc furnace, is supplied from a network 2 through a transformer 36. The core of the transformer is of shell construction and comprises a main flux carrying limb 20, a flux shifting limb 21, and an unsaturated limb 22 which is divided into two parts disposed respectively on either side of the limbs 20 and 21, the limb 22 providing an unsaturated flux return path. The primary winding 19, and the secondary winding 18, of the transformer embrace both the main limb 20 and the flux shifting limb 21. A further or auxiliary winding 15 embraces the flux shifting limb 21 only, and this winding is connected across the load 1.

It will be noted that the arrangement is very similar to that illustrated in FIGURE 4, but differs in respect of the transformer construction and the arrangement of its windings. In the present arrangement there is no need to provide an equalising winding owing to the fact that during both short circuit and open circuit conditions the flux is concentrated in the same limb, while the limb providing the return flux path remains unsaturated. The essential feature of this scheme is that the flux in limb 21 opposes the flux in limb 20 so that with the total flux through the limbs 20 and 21 fixed by the network voltage the application of a flux shifting voltage to limb 21 will drive the flux through the main limb 20 into saturation when the flux shifting voltage derived from the furnace arc is large.

Figure 7:
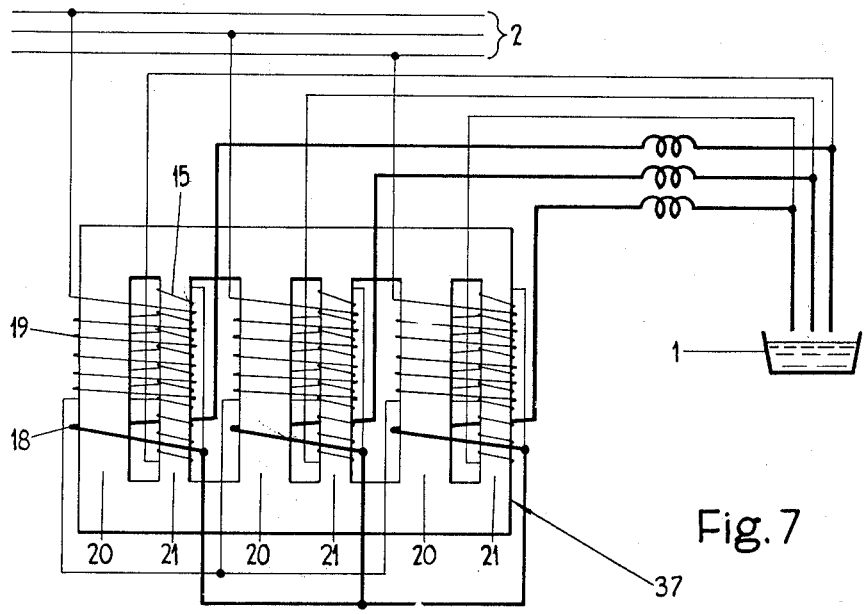

Referring now to FIGURE 7, the load 1 is supplied from a three phase network 2 through a transformer 37. The transformer is constructed to provide three pairs of limbs 20 and 21 associated with the three phases of the supply respectively. As in the preceding arrangement, each phase of the primary winding 19, embraces both limbs, and auxiliary windings 15 connected across the load 1 embrace the limbs 21 only.

This arrangement is the three phase equivalent of that shown in FIGURE 1, but in this case the unsaturated flux return path in respect of each phase is provided by the limbs associated with the other two phases.

In operation, under short circuit conditions, the flux in the limbs 21 is zero and consequently the transformer acts as a conventional three phase transformer. Under open circuit conditions, however, the windings 15 enforce a reversal of flux in the limbs 21, and since the total flux must remain the same as enforced by the primary winding the main flux carrying limbs become saturated.

Although the invention has been described with particular reference to arc furnaces, it will be appreciated that it is applicable also to arc welding equipment, the arrangement shown in FIGURE 7 being particularly suitable for such equipment.

I claim:

1. In an electric supply arrangement in which a fluctuating load is fed from an alternating current electric supply network, means for reducing voltage flicker on the network arising from load fluctuations, said means comprising:
   (a) a circuit including saturable reactor means,
   (b) means connecting said circuit across said supply network,
   (c) an inductance winding,
   (d) circuit means connecting said inductance winding across said fluctuating load, and
   (e) means constituting an inductive coupling between said inductance winding and said circuit.

2. In an electric supply arrangement in which a fluctuating load is fed from an alternating current electric supply network, means for reducing voltage flicker on the network arising from load fluctuations, said means comprising:
   (a) saturable reactor means,
   (b) transformer means,
   (c) said transformer means comprising a primary winding and a secondary winding,
   (d) circuit means connecting said entire saturable reactor means with the same sense in series with said secondary winding,
   (e) circuit means connecting said entire saturable reactor means with the same sense to the supply network through said secondary winding, and
   (f) circuit means connecting said primary winding across said fluctuating load.

3. In an electric supply arrangement in which a fluctuating load is fed from an alternating current electric supply network, means for reducing voltage flicker on the network arising from load fluctuations, said means comprising:
   (a) saturable reactor means,
   (b) circuit means connecting said saturable reactor means across said supply network,
   (c) an inductance winding,
   (d) circuit means connecting said inductance winding across said fluctuating load, and
   (e) means constituting an inductive coupling between said inductance winding and said saturable reactor means.

4. In an electric supply arrangement in which a fluctuating load is fed from an alternating current electric supply network, means for reducing voltage flicker on the network arising from load fluctuations, said means comprising:
   (a) saturable reactor means,
   (b) said saturable reactor means constituting a three limb saturable magnetic core and a reactor winding wound on one limb thereof, (c) circuit means connecting said reactor winding across the supply network,
(d) a further winding wound upon a second limb of said core, said further winding being inductively coupled to said reactor winding, and
(e) circuit means connecting said further winding across said fluctuating load.

5. In an electric supply arrangement in which a fluctuating load is fed from an alternating current electric supply network, means for reducing voltage flicker on the network arising from load fluctuations, said means comprising:
(a) saturable reactor means,
(b) said saturable reactor means constituting a three limb saturable magnetic core and a reactor winding wound on one limb thereof,
(c) circuit means connecting said reactor winding across the supply network,
(d) a further winding wound upon a second limb of said core, said futrher winding being inductively coupled to said reactor winding,
(e) circuit means connecting said further winding across said fluctuating load, and
(f) means for equalising the magnetic fluxes of said core limbs, said means constituting a delta-connected winding linking said three core limbs.

6. In an electric supply arrangement in which a fluctuating load is fed from a three-phase electric supply network, means for reducing voltage flicker on the network arising from load fluctuations, said means comprising:
(a) saturable reactor means,
(b) said saturable reactor means constituting three separate three limb saturable magnetic cores and a reactor winding wound upon a first limb of each said core,
(c) a further winding wound upon a second limb of each said core, each said further winding being inductively coupled to a respective said reactor winding,
(d) circuit means connecting said reactor windings across said supply network, and
(e) circuit means connecting said further windings across said fluctuating load.

7. In combination with an alternating current supply network, a circuit arrangement for feeding a fluctuating load from the network, the arrangement comprising:
(a) a first transformer,
(b) said first transformer having a primary winding and a secondary winding,
(c) circuit means connecting said primary winding across the supply network,
(d) circuit means connecting said secondary winding across a load,
(e) a second transformer,
(f) said second transformer having a primary winding and a secondary winding,
(g) circuit means connecting the primary winding of the second transformer across the load,
(h) saturable reactor means,
(i) circuit means connecting the saturable reactor means in series with the secondary winding of said second transformer, and
(j) circuit means connecting the saturable reactor means to the supply network through the second said secondary winding and in parallel with the first said primary winding.

8. In combination with an alternating current supply network, a circuit arrangement for feeding a fluctuating load from the network, the arrangement comprising:
(a) a supply transformer,
(b) said supply transformer having a primary winding and a secondary winding,
(c) circuit means connecting said primary winding across the supply network,
(d) circuit means connecting said secondary winding across a load,
(e) saturable reactor means,
(f) circuit means connecting said saturable reactor means across the supply network in parallel with said primary winding,
(g) an inductance winding,
(h) circuit means connecting said inductance winding across the load, and
(i) means constituting an inductive coupling between said inductance winding and said saturable reactor means.

9. In combination with an alternating current supply network, a circuit arrangement for feeding a fluctuating load from the network, the arrangement comprising:
(a) a supply transformer,
(b) said supply transformer having a primary winding and a secondary winding,
(c) circuit means connecting said primary winding across the supply network,
(d) circuit means connecting said secondary winding across a load,
(e) saturable reactor means,
(f) said saturable reactor means constituting a three limb saturable magnetic core and a reactor winding wound on one limb thereof,
(g) circuit means connecting said reactor winding across the supply network in parallel with said primary winding,
(h) a further winding wound upon a second limb of said core, said further winding being inductively coupled to said reactor winding,
(i) circuit means connecting said further winding across the load, and
(j) means for equalising the magnetic fluxes of said core limbs, said means constituting a delta-connected winding linking said three core limbs.

10. In combination with an alternating current supply network, a circuit arrangement for feeding a fluctuating load from the network, the arrangement comprising:
(a) transformer means,
(b) said transformer means constituting a saturable magnetic core having a plurality of limbs and a primary winding and a secondary winding wound upon a first limb of the core,
(c) circuit means connecting said primary winding across the supply network,
(d) circuit means connecting said secondary winding across the load,
(e) a further winding wound upon a further limb of said core, and
(f) circuit means connecting said further winding across the load.

11. In combination with an alternating current supply network, a circuit arrangement for feeding a fluctuating load from the network, the arrangement comprising:
(a) transformer means,
(b) said transformer means constituting a saturable magnetic core having a main flux carrying limb and an auxiliary limb, a primary winding and a secondary winding wound upon both said limbs, and an auxiliary winding wound upon said auxiliary limb,
(c) circuit means connecting said primary winding across said supply network,
(d) circuit means connecting said secondary winding across the load, and
(e) circuit means connecting said auxiliary winding across the load.

12. In combination with a three phase alternating current supply network, a circuit arrangement for feeding a fluctuating load from the network, the arrangement comprising:
(a) a supply transformer,
(b) said transformer comprising a saturable magnetic core and a three phase primary winding and a three phase secondary winding wound upon said core, (c) said core having three pairs of limbs, each pair constituting a main flux carrying limb and an auxiliary limb,
(d) each phase of said primary winding and each phase of said secondary winding being wound upon a respective one of said pairs of core limbs,
(e) circuit means connecting said primary winding across the supply network,
(f) circuit means connecting said secondary winding to a load, and
(g) means for modifying the degree of saturation of said core in dependence upon load voltage fluctuations, said means comprising
  (i) an auxiliary winding wound upon each of said auxiliary limbs, and
  (ii) circuit means connecting said auxiliary winding in a star across the load.

References Cited by the Examiner
UNITED STATES PATENTS

| | | | |
|---|---|---|---|
| 1,968,346 | 7/34 | Neiss | 323—56 |
| 2,486,165 | 10/49 | Journeaux | 323—57 |
| 2,504,909 | 4/50 | Tubbs | 323—81 X |
| 2,930,998 | 3/60 | Bastian | 323—56 |
| 2,947,946 | 8/60 | Grayson et al. | 323—56 |
| 3,111,621 | 11/63 | Spinks | 323—76 |

LLOYD McCOLLUM, *Primary Examiner.*